(12) United States Patent
Huth et al.

(10) Patent No.: US 11,895,190 B2
(45) Date of Patent: Feb. 6, 2024

(54) ENERGY-EFFICIENT COMMUNICATION BETWEEN SENSOR AND SATELLITE

(71) Applicant: Siemens Aktiengesellschaft, Munich (DE)

(72) Inventors: Hans-Peter Huth, Munich (DE); Florian Zeiger, Höhenkirchen-Siegertsbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 260 days.

(21) Appl. No.: 17/615,173

(22) PCT Filed: Jun. 2, 2020

(86) PCT No.: PCT/EP2020/065160
§ 371 (c)(1),
(2) Date: Nov. 30, 2021

(87) PCT Pub. No.: WO2020/245095
PCT Pub. Date: Dec. 10, 2020

(65) Prior Publication Data
US 2022/0239745 A1 Jul. 28, 2022

(30) Foreign Application Priority Data
Jun. 6, 2019 (EP) .................................... 19178817

(51) Int. Cl.
*H04L 67/12* (2022.01)
*H04W 4/38* (2018.01)
(Continued)

(52) U.S. Cl.
CPC .............. *H04L 67/12* (2013.01); *H04L 67/04* (2013.01); *H04L 67/52* (2022.05); *H04L 67/62* (2022.05); *H04W 4/38* (2018.02)

(58) Field of Classification Search
CPC ....................................................... H04L 67/12
See application file for complete search history.

(56) References Cited

U.S. PATENT DOCUMENTS

| | | | | |
|---|---|---|---|---|
| 5,490,076 A | * | 2/1996 | Rawicz | H04B 10/118 701/472 |
| 7,693,702 B1 | * | 4/2010 | Kerner | G06T 19/006 703/22 |
| 2002/0190898 A1 | * | 12/2002 | Abraham | G01S 19/05 342/357.43 |

FOREIGN PATENT DOCUMENTS

EP 1050978 A2 11/2000

OTHER PUBLICATIONS

Siemens AG: "Sensor data delivery time optimization for satellite systems", Prior Art Publishing GMBH, Prior Art Journal 2019 #08, pp. 136-137, www.priorartregistercom, 2019.
(Continued)

*Primary Examiner* — Hsinchun Liao
(74) *Attorney, Agent, or Firm* — Lempia Summerfield Katz LLC

(57) ABSTRACT

The disclosure relates to methods for a communication between a sensor and a satellite, and sensors for carrying out such a method. The sensor has a transmission unit for transmitting sensor data from the sensor to the satellite and a computing unit for calculating the position of the satellite at a specified point in time. The satellite is configured to receive and forward the sensor data. The method includes calculating a coverage duration using path parameters of the satellite and the position of the sensor, activating the transmission unit of the sensor during a transmission duration based on the calculated coverage duration, and transmitting the sensor data from the sensor to the satellite during the transmission duration.

19 Claims, 2 Drawing Sheets

(51) Int. Cl.
    *H04L 67/52*     (2022.01)
    *H04L 67/62*     (2022.01)
    *H04L 67/04*     (2022.01)

(56) References Cited

OTHER PUBLICATIONS

De Sanctis, Mauro, et al. "Satellite communications supporting internet of remote things." IEEE Internet of Things Journal 3.1 (2015): 113-123.

PCT International Search Report and Written Opinion of International Searching Authority dated Aug. 3, 2020 corresponding to PCT International Application No. PCT/EP2020/065160.

\* cited by examiner

ENERGY-EFFICIENT COMMUNICATION BETWEEN SENSOR AND SATELLITE

The present patent document is a § 371 nationalization of PCT Application Serial No. PCT/EP2020/065160, filed Jun. 2, 2020, designating the United States, which is hereby incorporated by reference, and this patent document also claims the benefit of European Patent Application No. 19178817.3, filed Jun. 6, 2019, which is also hereby incorporated by reference.

TECHNICAL FIELD

The disclosure relates to a method for energy-efficient communication between a sensor and a satellite. The disclosure furthermore relates to a sensor suitable for communicating energy-efficiently with a satellite. The disclosure makes it possible that sensor data may be transmitted from a sensor to a satellite in an energy-saving fashion.

BACKGROUND

It is expected that, in future digitally networked systems, sensors will transmit their data to other subscribers not only via cabled or wireless computer networks but also via satellites. In the case of non-geostationary satellites, (e.g., satellites which are not always located over the same point on the Earth), there is the challenge that a sensor may establish radio contact with the satellite only in very particular, e.g., relatively short time periods. The geographical region in which a sensor has to be located at a particular instant in order to be able to send information, (e.g., sensor data), to the satellite is referred to in the scope of this patent application as the footprint region of the satellite. Because, in the case of non-earthbound satellites, the satellite moves relative to a stationary sensor located on the Earth, the sensor is not always in the footprint region of the satellite, but only in particular time periods. The time period in which the sensor is located in the footprint region of the satellite is referred to in the scope of this patent application as the coverage time period.

Satellites conventionally send to the Earth at regular intervals signals which contain information relating to their identity (e.g., a unique designation of the satellite), their orbital trajectory and the instant at which the satellite transmitted the signal. These signals, which are also referred to in the technical terminology as beacons, may be transmitted (or emitted) by a satellite in a particular emission cone, so that the signals may be received by any receiver that is configured to receive such signals.

A sensor which intends to send its sensor data via satellite to a recipient is conventionally equipped with a reception unit for receiving the aforementioned satellite signals, (e.g., beacons). The reception unit is permanently turned on in order to recognize by receiving a satellite signal of a satellite that a satellite is currently in radio range, or in other words that the sensor is currently located in the footprint region of a satellite. This information is needed for the sensor because the sensor may transmit its sensor data to the satellite only when the sensor is located in the instantaneous footprint region of the satellite. As an alternative to turning the reception unit on permanently, the reception unit may also be turned on and off at regular (or irregular) intervals in order to recognize any transmitted satellite signal.

Because the sensor has no information about when the next satellite will come into radio range of it, the reception unit for receiving satellite signals in such sensors is thus conventionally activated permanently or is activated at least at regular (or irregular) intervals. An activated reception unit consumes electricity, that is to say energy.

A disadvantage with conventional sensors that communicate with satellites is thus that their energy consumption is relatively high.

SUMMARY AND DESCRIPTION

It is an object of the present disclosure to reduce the energy required for communication between a sensor and one or more satellites in comparison with the prior art.

This object is achieved by the method and the sensor described herein. The scope of the present disclosure is defined solely by the appended claims and is not affected to any degree by the statements within this summary. The present embodiments may obviate one or more of the drawbacks or limitations in the related art Accordingly, a method for communication between a sensor and a satellite is provided. The sensor in this case has a transmission unit for transmitting sensor data from the sensor to the satellite and a calculation unit for calculating a position of the satellite at a particular instant. The satellite is configured to receive and forward the sensor data to a base station, for example.

The method includes calculating a coverage time period with the aid of trajectory parameters of the satellite and the position of the sensor, wherein the coverage time period corresponds to the time period in which the sensor is located in a footprint region of the satellite. The method further includes activating the transmission unit of the sensor during a transmission time period based on the calculated coverage time period, wherein the coverage time period or a part thereof is selected as the transmission time period. The method further includes transmitting the sensor data from the sensor to the satellite during the transmission time period.

The energy consumption of a sensor that communicates with one or more satellites may be reduced significantly when the sensor is not permanently kept on standby to transmit its sensor data to the next satellite located in radio range, but instead by the sensor calculating beforehand when the next suitable satellite will approach it and then (and only then) expediently being turned on. In other words, the sensor avoids being on standby for most of the time only to wait for the moment when a satellite comes into radio range of the sensor, but instead is expediently turned on when a pass of a satellite at a suitable range is expected.

Energy-efficient communication between a sensor and a satellite is thereby made possible. This results in a considerable saving potential on energy which is to be expended for operating the sensor, above all because the communication of a sensor with a satellite constitutes a significant proportion of the total energy requirement of the sensor. If a sensor is supplied with electrical energy by a battery (instead of a power outlet) and the energy supply is the limiting factor for the lifetime of the sensor, the electricity saving for the satellite communication furthermore has the indirect advantage of an extended lifetime, or length of use, of the sensor.

The disclosure is furthermore based on the discovery that the pass of a satellite over a sensor is deterministic and therefore predictable in principle. If the sensor is equipped with a corresponding calculation unit, the sensor itself is capable of calculating the orbit of the satellite based on the trajectory parameters of the satellite and predicting future positions of the satellite (see below for the definition of the trajectory parameters). This is possible, for example, by entering the trajectory parameters into a known propagation model. By taking into account its own position, the sensor thus knows as a result when it will next be located in the footprint region of a satellite and may expediently activate the transmission unit at this instant.

The calculation of the position of the satellite at a particular instant therefore relates in particular to future positions of the satellite. In other words, the calculation unit may be capable of predicting when a particular satellite will be located at a particular place in the future.

This is possible in principle with the aid of trajectory parameters. As disclosed herein, the trajectory parameters of a satellite refer to a set of parameters which contain sufficient information to be able to calculate the position of the satellite at in principle any instant. The trajectory parameters accordingly contain parameters for calculating the orbital trajectory of the satellite, which are suitable for calculating the location of the satellite on its orbital trajectory at any instant. In other words, the trajectory parameters may describe the parameters for the orbital trajectories of objects which orbit a celestial body according to Kepler's laws.

The trajectory parameters are also referred to in the technical jargon as satellite trajectory elements. The trajectory parameters are used during the trajectory determination of the object and include six trajectory elements of an unperturbed system and a time specification. Optionally, the trajectory parameters additionally contain correction parameters which take into account trajectory perturbations, (e.g., due to friction with the atmosphere, an inhomogeneous gravitational field, solar storms, or radiation pressure).

The trajectory elements for most satellites have been made available as "two-line elements" (TLEs) by the US Air Force Space Command and by organizations such as NASA or AMSAT. The trajectory parameters thus include a set of parameters which, as standardized in the two-line elements, contain sufficient information to be able to calculate the position of the satellite at in principle any instant. The TLEs may include numerical eccentricity, mean motion, inclination, right ascension of the ascending node, argument of the perigee, mean anomaly, or epoch with date and time.

Optionally, the TLEs furthermore contain a resistance coefficient and further perturbation coefficients.

As is conventional in astronomy, the epoch denotes an instant to which the specifications of the trajectory elements relate. One known example of an epoch is "Y2000.0" which is defined as Jan. 1, 2000, 11:58:55.816 of the Coordinated Universal Time (UTC).

The trajectory parameters may furthermore contain information relating to the footprint region.

In a first embodiment, the trajectory parameters are specified to the sensor during an initialization of the method.

This means that the trajectory parameters of all the satellites which may be envisioned as communication partners of the sensor, that is to say as receivers of the sensor data, are specified to the sensor when it is set up.

This has the advantage that the sensor does not itself have to obtain the trajectory parameters of the corresponding satellites. Furthermore, specifying the trajectory parameters has the advantage that the sensor may begin to transmit sensor data expediently to the intended satellites immediately after setting up.

A disadvantage with externally specified trajectory parameters is that they are sometimes not up to date. There are satellites, (e.g., satellites that orbit at a relatively low altitude above the Earth's surface), whose trajectory parameters are repeatedly updated at short intervals (for example, weekly). Unpredicted downtimes or unpredicted changes of the orbital trajectory may also occur with satellites. Additionally, it is also possible for new satellites to be added after the sensor has been set up. It is also possible for the sensor itself to change its position on the Earth, so that other satellites are then available as communication partners.

All the aforementioned disadvantages are addressed by a second embodiment. For this purpose, the sensor is equipped with a reception unit in addition to the transmission and calculation unit. The reception unit is intended and configured to receive a satellite signal of a satellite, wherein the satellite signal contains the trajectory parameters of the satellite. In the method for communication between the sensor and the satellite, the reception unit of the sensor then receives the satellite signal of the satellite in a first act. In subsequent acts, the method calculates the coverage time period, activates the transmission unit, and transmits the sensor data.

The satellite signals may be received and further processed just once after setting up the sensor. It is, however, advantageous for the sensor to interrogate (or receive) the satellite signals of the relevant satellites again at particular intervals in order optionally to adjust the trajectory calculations of the satellite if the trajectory parameters have changed.

For this, it is necessary to equip the sensor with a reception unit. In one embodiment, the transmission and reception unit may for this purpose advantageously be configured as a combined transmission/reception unit (e.g., transceiver).

For each satellite, there is a data set which describes its trajectory. This data set may be available in a base station. The base station makes the data set available to the respective satellite. The base station repeatedly updates the trajectory parameters, for example, when the orbital trajectory of the satellite has changed.

In one embodiment, the satellite signal also contains information relating to the identity of the satellite. This is used to identify the satellite uniquely system-wide.

The identification is carried out, for example, by tagging with a so-called unique ID (UID), by which each geostationary or Earth-orbiting satellite may be uniquely identified.

In a further embodiment, the satellite signal furthermore contains the instant at which the satellite signal was transmitted by the satellite.

This information is important, for example, when the sensor does not have its own time unit. Even if the sensor has a corresponding time unit, the time received from the satellite may be used to match the system time of the sensor with the time of the satellite.

Furthermore, the satellite may also communicate information relating to planned downtimes to the sensor. This may be advantageous insofar as the sensor may take these downtimes into account when planning the activation of the transmission unit.

The position of the sensor, or at least an approximate position specification thereof, is needed for calculating the coverage time period (e.g., contact time window) of the satellite in relation to the sensor. There are various possibilities of how the position of the sensor may be determined or estimated.

In a first alternative, the position of the sensor is specified to the sensor during an initialization of the method.

Any position determination by the sensor itself is thereby obviated, so that this type of position specification seems to be the simplest method. However, this alternative is viable only for stationary sensors and sensors which move only slowly during their period of operation in relation to the area swept by the satellite.

In a second alternative, the position of the sensor is determined by a global position determination system.

For this, the sensor may contain a conventional reception module (or GPS receiver) for determining its position by a global navigation satellite system. An advantage of this is the wide availability and established reliability of GPS receivers. Disadvantages, besides the costs incurred, are also possible difficulties with the position determination, for example, when the GPS receiver is hidden from the navigation satellites.

In a third alternative, the position of the sensor is determined or estimated by the trajectory parameters contained in the received satellite signal.

With the aid of the trajectory parameters, the sensor knows the position of the satellite at any instant. When the sensor receives the satellite signal, it may deduce an approximate footprint region therefrom (e.g., if the satellite has not already communicated its footprint region to the sensor anyway). The more satellite signals the sensor receives (e.g., advantageously from a plurality of passes of one or more satellites), the better the sensor may deduce its own position. The sensor therefore determines its position as a function of the satellites located in the transmission/reception range at particular instants.

This offers a range of advantages.

In one advantage, (exact) knowledge of the position at which a sensor is installed is no longer necessary. The sensor is capable of determining its position itself. In the case of mobile sensors, the position may also be repeatedly updated.

In another advantage, preconfiguration of the sensor, except for presettings which relate to the link of the sensor to the satellite (for example radio frequency), is no longer necessary. All parameters which the sensor needs for calculating the coverage time period are received by the sensor from the satellite.

In a further advantage of the described method, the method may be used both for stationary and for mobile sensors. For mobile sensors, the only restriction is that the sensor's position change over a certain time period is small in comparison with the extent of the footprint region. To give a specific example: with an assumed diameter of the satellite footprint region of 1000 km and an orbital period of the satellite of 90 minutes, for example, in three successive satellite orbits one contact window with the satellite in each of them may be presumed. That is to say, if the sensor has moved a distance of only a few hundred kilometers (for example, 200 km) between the passes, the sensor will still be able to communicate with the satellite at the calculated contact times.

The time period in which the transmission unit is ready to transmit sensor data (e.g., activated) is referred to as the transmission time period. It is thus the time period in which the transmission unit may consume energy. The transmission time period (at least partially) lies within the coverage time period because there is radio contact between the sensor and the satellite only during the coverage time period. Advantageously, the transmission unit is not activated outside the coverage time period—the energy saving which the method offers is made possible precisely by the fact that turning the transmission unit on at times when there is no radio contact anyway is avoided.

The coverage time period of a sensor located on the Earth may be between 1-2 minutes and about fifteen minutes for non-geostationary satellites. If the sensor is close to the edge of the, e.g., circular footprint region, the sensor has radio contact with the satellite, for example, only for 1-2 minutes. If it is in the middle, it may be 10-15 minutes. Because the sensor may predict the coverage time period precisely, it is advantageous for the transmission time period to be selected not substantially longer than is necessary for transmission of the sensor data to the satellite. A transmission time period of, for example, 10 seconds, which, as already mentioned above, lies within the coverage time period, may be mentioned here by way of example.

The disclosure furthermore relates to a sensor configured to carry out the described method.

The sensor may be a so-called Industrial Internet of Things (IIoT) Sensor.

The sensor includes a calculation unit for calculating a position of a satellite at a particular instant and a transmission unit for transmitting sensor data from the sensor to the satellite. The calculation unit is in this case configured to calculate a coverage time period with the aid of trajectory parameters of the satellite and the position of the sensor, wherein the coverage time period corresponds to the time period in which the sensor is located in a footprint region of the satellite. The transmission unit is configured to be activated during a transmission time period based on the calculated coverage time period, wherein the coverage time period or a part thereof is selected as the transmission time period. The transmission unit is furthermore configured to send the sensor data from the sensor to the satellite during the transmission time period. Optionally, the sensor furthermore has a reception unit for receiving a satellite signal of the satellite, wherein the satellite signal contains the trajectory parameters of the satellite.

For explanation of the individual features of the sensor, reference is made to the above explanations of the corresponding method in order to avoid repetition.

In one embodiment, the sensor furthermore has a time unit for providing a system time.

The time unit may be an internal timer, (e.g., a chip), which contains a counting register and a quartz crystal as a pulse generator. The internal timer is synchronized with a system time.

The time unit may also be a so-called software clock which merely receives time signals of an external timer. Examples of an external timer are time signal transmitters, for example, the DCF77 longwave transmitter at Mainflingen near Frankfurt am Main or time servers which provide the Network Time Protocol (NTP).

The time unit may also be a receiver of a satellite supported time, for example, from a Sat-based positioning system (for example GPS, GLONASS) or from the satellite described here.

The sensor furthermore may have the sensor element per se (for example, temperature sensors, vibration meters, acceleration sensors) as well as a measurement converter ("transmitter"). The measurement converter converts the data generated by the sensor element into data that may be used for the communication via satellite.

BRIEF DESCRIPTION OF THE DRAWINGS

The disclosure will be illustrated below with the aid of the appended figures. The figures show embodiments selected by way of example and schematically, without restriction of the claimed protective scope.

DETAILED DESCRIPTION

Figure 1:
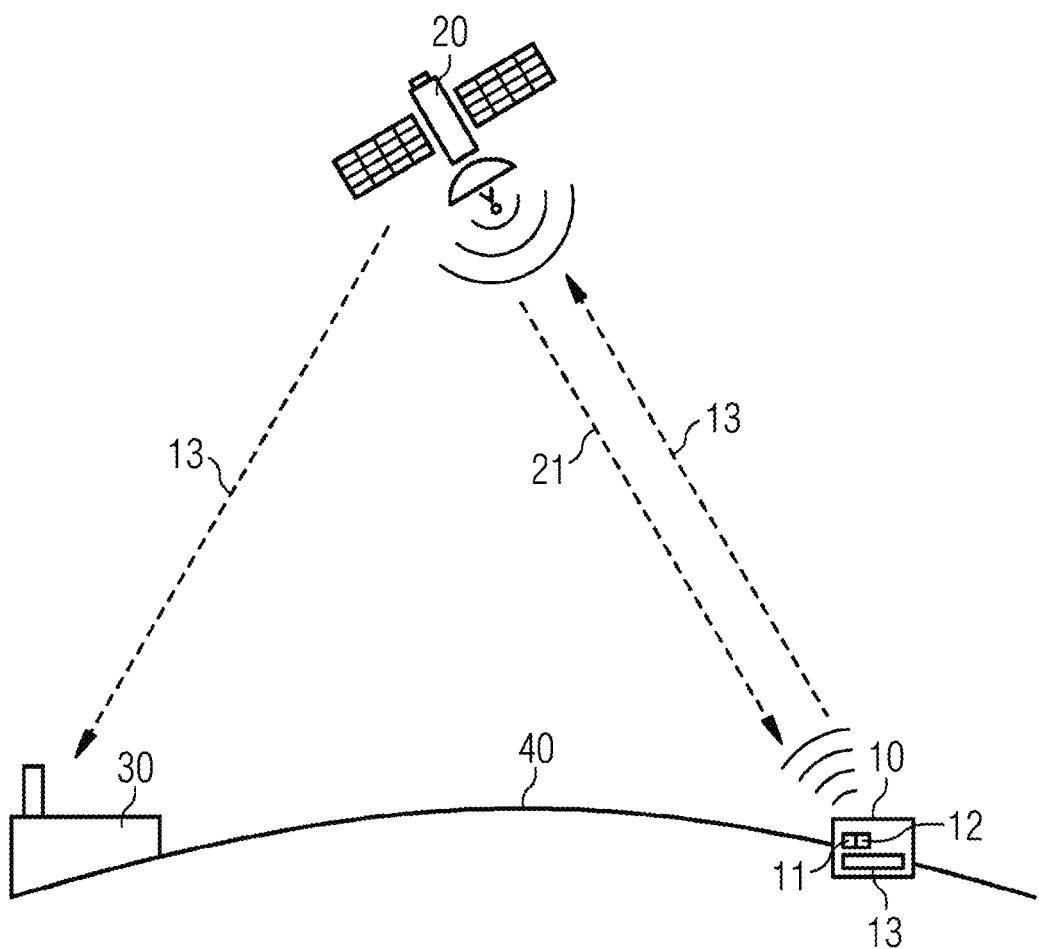
FIG. 1 depicts an example of a sensor that communicates with a satellite.

FIG. 1, also abbreviated to FIG. 1, shows an arrangement including a sensor 10 located on the Earth 40, a satellite 20, and a base station 30. The satellite 20 is configured to transmit a satellite signal 21, (also referred to in the technical terminology as a beacon), at periodic intervals. The satellite signal 21 may be received by any receivers which are located within the range of the signal 21 and are suitable for receiving such signals 21. The sensor 10 has a corresponding reception unit 12 for receiving such satellite signals 21. The sensor 10 furthermore has a transmission unit 11, which is configured to transmit sensor data 14 to the satellite 20.

The satellite signal 21 contains trajectory parameters of the satellite 20. The trajectory parameters are also referred to in the technical terminology as satellite trajectory elements and may be compiled in a standardized format, for example, the two-line element format. The trajectory parameters contain sufficient information so that the position of the satellite 20 may be calculated at any desired instant.

The sensor 10 makes use of this. The sensor 10 is equipped with a calculation unit 13. The calculation unit 13 calculates, based on the received trajectory parameters and the knowledge of the (own) position of the sensor 10, when the sensor 10 will be located in the footprint region of the satellite 20 again. In other words, the calculation unit 13 calculates the coverage time period, in which time period the sensor 10 will thus next be located in the footprint region of the satellite 20 again.

The satellite 20 is configured to forward the sensor data 14 received from the sensor 10 to a base station 30. The base station 30 may be, for example, a (central) server, an installation with a processing unit, or a further sensor. The person skilled in the art familiar with IIoT systems may arrange this accordingly.

Figure 2:
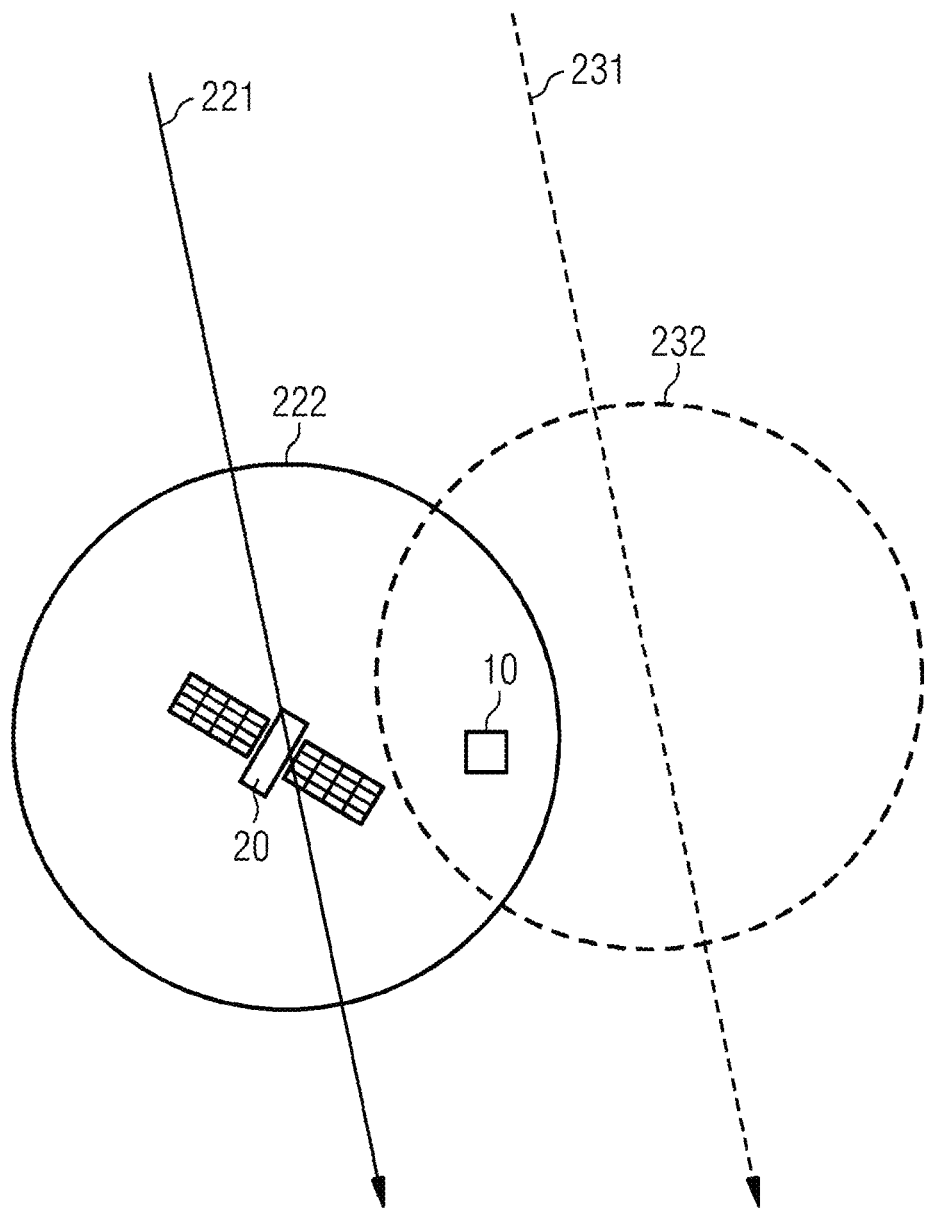
FIG. 2 depicts an example of a sensor located in a footprint region of a satellite.

FIG. 2, also abbreviated to FIG. 2, shows a satellite 20 which is located on a first orbital trajectory 221. The area of the Earth which is located in radio range of the satellite 20 is referred to as a footprint region and is illustrated in FIG. 2 by a circle, at the center of which the satellite 20 is located. To give a specific numerical example purely by way of example: footprint regions of non-geostationary satellites, which may be configured to communicate with IIoT sensors, may have diameters of between 200 and 1000 km.

In FIG. 2, the sensor 10 is currently in the first footprint region 222 of the satellite 20. The sensor 10 may now transmit sensor data 14 to the satellite 20 by the transmission unit 11.

The sensor 10 also knows when the sensor should expect the next pass of the satellite 20. By the calculation unit 13, the sensor 10 may calculate the time period when the sensor 10 will next be in the footprint region of the satellite. This is symbolized by the dashed second footprint region 232 in FIG. 2. The second footprint region 232 describes the footprint region of the satellite 20 when it is located on its second orbital trajectory 231 at a particular time.

By virtue of the "smart" sensor, the transmission unit of the sensor may expediently be activated precisely when the sensor is in radio range of a suitable satellite. It is therefore possible to save energy which would otherwise have to be expended for standby of the transmission unit.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for communication between a sensor and a satellite, wherein the sensor has a transmission unit for transmitting sensor data from the sensor to the satellite and a calculation unit for calculating a position of the satellite at a particular instant, and wherein the satellite is configured to receive and forward the sensor data, the method comprising:
   calculating a coverage time period with aid of trajectory parameters of the satellite and a position of the sensor, wherein the coverage time period corresponds to a time period in which the sensor is located in a footprint region of the satellite;
   activating the transmission unit of the sensor during a transmission time period based on the calculated coverage time period, wherein the coverage time period or a part of the coverage time period is selected as the transmission time period; and
   transmitting the sensor data from the sensor to the satellite during the transmission time period.

2. The method of claim 1, wherein the trajectory parameters contain information relating to an orbital trajectory of the satellite.

3. The method of claim 2, wherein the trajectory parameters also contain information relating to the footprint region of the satellite.

4. The method of claim 3, wherein the trajectory parameters are specified to the sensor during an initialization of the method.

5. The method of claim 2, wherein the trajectory parameters contain the information within a two-line element format.

6. The method of claim 1, the method further comprising, prior to the calculating of the coverage time period:
   receiving a satellite signal by a reception unit of the sensor,
   wherein the satellite signal contains the trajectory parameters of the satellite.

7. The method of claim 6, wherein the satellite signal also contains information relating to an identity of the satellite, which uniquely identifies the satellite system-wide.

8. The method of claim 7, wherein the satellite signal furthermore contains an instant at which the satellite signal was transmitted by the satellite.

9. The method of claim 6, wherein the position of the sensor is determined by the trajectory parameters contained in the received satellite signal.

10. The method of claim 6, wherein the satellite signal furthermore contains an instant at which the satellite signal was transmitted by the satellite.

11. The method of claim 1, wherein the position of the sensor is specified to the sensor during an initialization of the method.

12. The method of claim 1, wherein the position of the sensor ROOM is determined by a global position determination system.

13. The method of claim 1, wherein the trajectory parameters contain information relating to the footprint region of the satellite.

14. The method of claim 1, wherein the trajectory parameters are specified to the sensor during an initialization of the method.

15. A sensor comprising:
a calculation unit for calculating a position of a satellite at a particular instant; and
a transmission unit for transmitting sensor data from the sensor to the satellite,
wherein the calculation unit is configured to calculate a coverage time period with aid of trajectory parameters of the satellite and a position of the sensor, wherein the coverage time period corresponds to a time period in which the sensor is located in a footprint region of the satellite,
wherein the transmission unit is configured to be activated during a transmission time period based on the calculated coverage time period, the coverage time period or a part thereof being selected as the transmission time period, and
wherein the transmission unit is furthermore configured to send the sensor data from the sensor to the satellite during the transmission time period.

16. The sensor of claim 15, further comprising:
a reception unit for receiving a satellite signal of the satellite, the satellite signal containing the trajectory parameters of the satellite.

17. The sensor of claim 16, wherein the transmission unit and the reception unit are configured as a combined transmission/reception unit.

18. The sensor of claim 16, further comprising:
a time unit for providing a system time.

19. The sensor of claim 15, further comprising:
a time unit for providing a system time.

* * * * *